INVENTOR
KENNETH C. COLLINS 3,443,338
TOY INCLUDING A LIGHT IN FRONT OF A DOG
WHICH MOVES IN A LIFE-LIKE MANNER AND
A SOUND SIMULATING A BARK IS EMITTED
Kenneth C. Collins, 13639 Claire Blvd.,
Robbins, Ill. 60472
Filed Nov. 24, 1965, Ser. No. 509,555
Int. Cl. A63h 33/26, 13/02
U.S. Cl. 46—227        3 Claims

ABSTRACT OF THE DISCLOSURE

This toy includes a light, a dog facing the light and structure for emitting a sound which simulates the barking of a dog. At the same time mechanism within the dog causes it to nod its head, open and close its mouth and move up and down at its front legs so that an observer hears and sees the dog as barking at the light.

Figure 1:
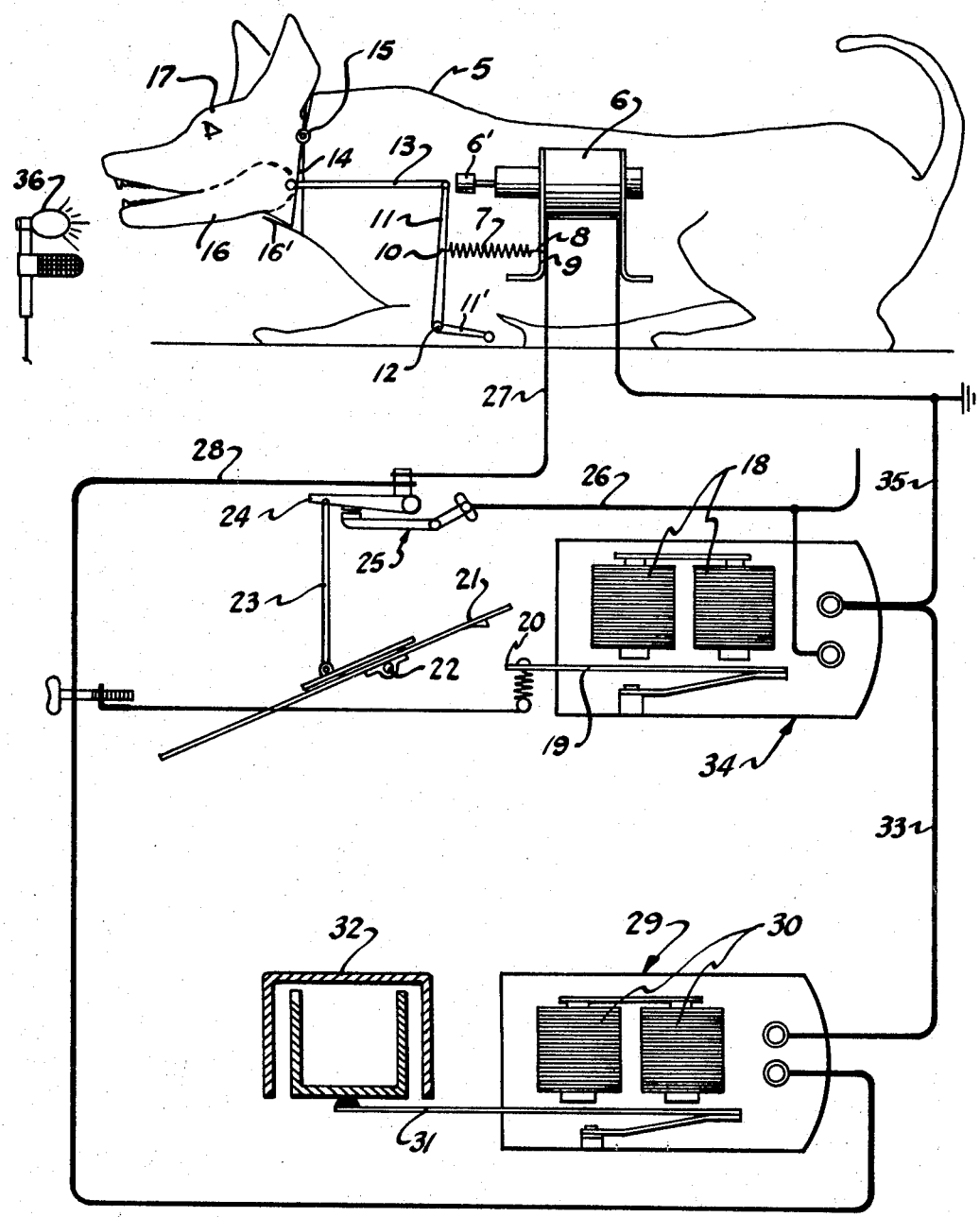

This invention relates to toys, and more particularly to a toy specially adapted to amuse people of all ages, and still more particularly to a toy animal that in this instance is made in the form of a dog.

Of all the toy animals that have ever been produced, none have greater appeal to both children and grown-ups as have toy dogs, particularly if they are made having life-like movements.

It is therefore the principal object of this invention to provide a toy animal in the form of a dog that cannot only be made to wag its head, but to bark as well, in a most life-like manner.

Another object of this invention is to provide an inexpensive toy animal in the form of a dog that is activated by inexpensive electrically operated mechanism.

Still another object of this invention is to provide a toy animal in the form of a dog that will both bark at a light in front of it, and at the same time wag its head and move up and down at its front legs.

Other and further objects of this invention will become apparent as the description of this novel invention proceeds and one examines the appended drawing in which:

The single figure is a combined side view of this invention and a diagram of its electrically activated mechanisms.

Looking now at the drawing, it will be seen that this invention of a hollow toy animal embodies a toy dog 5 of any desired size and made of any desired material. A horizontally disposed solenoid 6 having an armature hammer 6' is suitably mounted within the body of the aforesaid toy dog 5. A horizontally mounted coil spring 7 has one end 8 fastened to the front vertical support 9 of the aforesaid solenoid 6, while the other end of the same spring 7 is fastened at 10 to the vertical lever 11 that has its lower end secured between the front legs of the dog by the pin 12. Lever 11 has a portion 11' which normally extends horizontally. The upper end of the aforesaid vertical lever 11 is connected to the rear end of the horizontal rod 13 that has its front end secured to the swinging head 17, there being a space 14 between the head 17 of the dog and its body to permit the head 17 to nod about its pivot 15. Jaw 16 is pivoted to the head. A wire 16' projects from the body and extends beneath the jaw 16 to move jaw 16 to open and close the mouth as the head nods. Each time that armature hammer 6' strikes vertical lever 11, head 17 nods, jaw 16 moves up and down and lever portion 11' moves up and down to raise and lower the front of the dog.

Continuing to look at the drawing, it will be seen that this invention is also provided with a pair of vertically disposed solenoids 18 that will activate the horizontally disposed spring-loaded lever 19, which in turn will have its outer end 20 strike one end of the vertically swinging lever 21 that is hingedly secured to a suitable support at 22, lever 21 being normally substantially horizontal. A vertically disposed cord 23 has its lower end secured to the upper surface of the aforesaid vertically swinging lever 21 which is, in effect, an off-balance lever, while the upper end of cord 23 is secured to the hingedly mounted lever 24 of the switch 25 that is connected to the positive electric wire 26. An electric wire 27 connects the switch 25 with the solenoid 6, while the electric wire 28 connects the same switch 25 with sound producing mechanism 29, which consists of a pair of solenoids 30, striker 31 and the sound chambers 32. These sound chambers comprise a plastic cup within another plastic cup which will emit a sound very much like the barking of a dog when struck by striker 31. A wire 33 connects the aforesaid sound-producing mechanism 29 with the solenoids 18, which are a part of the action-producing mechanism 34 of this invention. Not all of the wires of the aforesaid sound-producing mechanism 29 or the action-producing mechanism 34 are shown in the drawing. These wires have been omitted for reasons of clarity, since this part of the invention will obviously be clear and understandable to those experienced in the electrical arts. A wire or wires 35 run from the aforesaid action-producing mechanism 34 to both the aforesaid solenoid 6 and the ground or negative side of the electric supply line.

Since such parts of this invention as the switches that activate the sound-producing mechanism 29 and the action-producing mechanism 34 are old, and their method of being connected into the electric wiring of this invention is instantly understood by anyone having knowledge of the electrical arts, the aforesaid switches or their equivalent is neither shown in the drawing nor further mentioned in this specification other than it being said that when the switches are closed, the toy dog will either bark and/or nod its head, move up and down at its front legs, as well as open and close its mouth. Tail wagging mechanism, which is similar to that of the head-wagging mechanism and which is operated by the same solenoid 6, has also been omitted from the drawing for reasons of clarity. An electric light 36 may be so mounted in front of the aforesaid toy dog 5 that when the light is turned on, the toy dog will at once start to bark and nod its head and wag its tail. In fact, there is practically no limit to the various combinations of actions and sound to which this novel toy dog can be made to bark and move. Should the toy dog be big enough, then all of the sound and movement mechanism can be enclosed within its body. On small toy dogs, the sound and movement mechanism can be located nearby in a small box or the like, having the electric wires running to the underside and rear of the dog. The dog, of course, can be replaced by any toy animal, or even the figure of a person, if it is so desired.

It is to be understood that changes and modifications can be made in this invention as long as the changes and modifications fall within the scope and intent of the appended claims.

I claim:
1. A toy animal comprising a hollow toy animal preferably having the configuration of a dog, electrically actuated mechanism adapted to cause the toy dog to simulate a bark, a horizontally disposed solenoid located within the body of the said toy dog, mechanism operated by the solenoid to nod the head of the dog and open and close its mouth, a second solenoid, a different circuit for each solenoid, contacts in the circuit of the first solenoid which contacts are controlled by the second solenoid to open and close the circuit of the first solenoid.

2. The toy animal recited in claim 1 wherein a third solenoid is employed to produce the barking by means of mechanism connected to the lever of the said third solenoid.

3. The toy animal recited in claim 2 wherein an electric light is mounted in front of the said toy dog, the said electric light being connected into the electric circuit of the said toy dog energized when the solenoids are energized so that when the electric light is turned on, the said toy dog will bark, nod its head and open and close its mouth.

References Cited
UNITED STATES PATENTS

| | | | |
|---|---|---|---|
| 2,098,166 | 11/1937 | Rubenstein | 46—235 X |
| 2,659,998 | 11/1953 | Cavanaugh. | |
| 2,696,695 | 12/1954 | Decker | 46—175 |

LOUIS G. MANCENE, *Primary Examiner.*

R. F. CUTTING, *Assistant Examiner.*

U.S. Cl. X.R.

46—118, 175, 232